3,562,191
PLASTISOL COMPOSITION

Donald A. Giessler, Muncie, Ind., assignor to Ball Corporation, Muncie, Ind., a corporation of Indiana
No Drawing. Continuation of application Ser. No. 378,995, June 29, 1964. This application June 11, 1968, Ser. No. 744,598
Int. Cl. C08f *47/10;* C08v *1/20*
U.S. Cl. 260—2.5                                                        5 Claims

ABSTRACT OF THE DISCLOSURE

Closure having as the sealing portion thereof a solvent resistant, cellular plastisol gasket formed from a vinyl polymer, a phenolformaldehyde resin, a filler, at least one plasticizer, and a blowing agent, and said gasket composition which is bondable directly to metal surfaces.

---

This application is a continuation of copending U.S. application Ser. No. 378,995, filed June 29, 1964, entitled "Plastisol Composition" by Donald A. Giessler.

This invention relates to a new and improved plastisol composition and more particularly relates to a novel cellular plastisol composition which is resistant to solvents and adheres tightly to metal surfaces.

While vinyl plastisols have been widely used for a number of years, the use of vinyl plastisols in gaskets for closures of various types of containers such as cans, pails, drums, etc., has been somewhat limited by a lack of solvent resistance as well as poor adhesion of such plastisols to metal surfaces. Heretofore, in order to achieve satisfactory adhesion of the plastisol to the metal, it has been necessary in most cases to coat the metal surfaces with a base coating prior to the application of the plastisol.

Attempts have been made to modify the plastisol formulations in order to overcome the problems encountered in their use. However, none of the modifications provided a desirable high degree of solvent resistance together with a high degree of adhesion to bare metal surfaces.

In view of the above and other deficiences and shortcomings of vinyl plastisol gasket materials heretofore employed, it was completely unexpected and surprising to discover a novel vinyl plastisol composition which overcomes many of the deficiencies of prior materials and, in addition, provides advantages and benefits heretofore considered unattainable. For example, the vinyl plastisol formulation of the present invention has a high degree of solvent resistance and adheres tightly to bare metal surfaces. Moreover, the plastisol composition of the present invention is useful in the formation of gaskets having excellent sealing, removal and storage characteristics. In addition, the plastisol of the invention provides an additional advantage in that it has a cellular structure which is substantially free of surface holes. Furthermore, since the plastisol has a cellular structure, only a minimum amount of material is required to produce a soft, resilient gasket which has excellent performance characteristics. Moreover the plastisol composition of the invention is relatively low in cost and can be formulated without difficulty. Furthermore, the plastisol composition of the invention can be applied to bare metal surfaces in relatively thick sections while retaining tight adhesion to the metal surface.

The plastisol of the present invention comprises a vinyl polymer, a phenolic resin, a plasticizer, a blowing agent and a solvent.

The vinyl polymer may be made by known polymerization processes, for example, emulsion or suspension systems. Emulsion polymerization generally produces dense spherical particles having an average size of the order of about 1–2 microns, while suspension polymerization produces larger particles, e.g., of an average size of about 10 microns, but which otherwise are similar. The vinyl polymer generally is polyvinyl chloride or a copolymer of vinyl chloride with, for example, vinyl acetate, vinylidene chloride, or a similar vinyl type monomer. The copolymers are generally produced by suspension polymerization while the homopolymers are usually produced by emulsion polymerization. The specific viscosity of the vinyl polymer is advantageously between about 0.3 and 0.6 and preferably between about 0.35 and 0.45 as measured by ASTM Test Method D–1243, Method B.

The phenolic resin employed in the plastisol of the invention may be any of the heat reactive phenolic resins commercially available. The phenolic resin employed advantageously is in a finely divided form and preferably is combined with hexamethylene tetramine catalyst. Examples of typical resins include phenol-formaldehyde resin, an alkylated phenol-formaldehyde resin, a phenylphenol-formaldehyde resin, etc.

The plasticizer employed in the plastisol may be any of the conventionally employed polymeric plasticizers and advantageously, polymerized ester plasticizers, preferably having a molecular weight between about 4000 and 8000. The polymeric plasticizer advantageously may be combined with a diester plasticizer such as a diester of a dibasic acid, e.g., sebacic, adipic, and azelaic acids, and the like. Particularly useful in combination with the polymeric plasticizer in the plastisol composition of the invention are diesters of adipic acid with alkyl alcohols having 4 to 16 carbon atoms, although diesters of sebacic acid with alkyl alcohols having 4 to 8 carbon atoms and diesters of azelaic acid with alkyl alcohols having 4 to 8 carbon atoms, and mixtures of the various diesters are also useful.

The blowing agent incorporated in the plastisol composition may be one of the known blowing agents for vinyl polymers. For example, diazoamino benzene, dinitrosopentamethylene tetramine, 4,4′ oxybis (benzene sulfonyl hydrazide) and the like may be employed with azobisformamide being preferred.

The solvent may be any of the conventional aromatic or aliphatic solvents and advantageously is a solvent such as hexylene glycol, butylcarbitol, benzyl alcohol, etc. Solvents of the glycol ether type are preferred for use in the plastisol of the invention and particularly solvents having a boiling point above about 195° C.

The plastisol composition of the invention, advantageously, also includes a filler such as barium sulfate, calcium carbonate, or the like. Advantageously, barium sulfate is employed as the filler because it is substantially completely inert to the materials which it contacts as a component of the gasket.

In addition to the above components, other materials may be incorporated in the plastisol composition of the invention providing they do not adversely affect the benefits and advantages obtained by the plastisol of the invention. For example, pigments, stabilizers, lubricants, emulsifying or dispersing agents, and the like may be employed in the plastisol composition.

The proportions of the various ingredients in the plastisol composition may vary over wide ranges with the proportions by weight of the plasticizer being substantially equal to that of the resin and the proportion of the filler being somewhat less than the proportion of the resin. The solvent generally comprises less than about one-half the proportion of the vinyl resin. The phenolic resin and the blowing agent normally each comprise only a small percentage of the composition as compared with the four major ingredients above.

The proportion of the plasticizer or plasticizers in the gasket composition has a greater effect on the performance characteristics thereof and advantageously comprises between about 50 and 200 parts by weight for each 100 parts of the vinyl polymer with between about 75 and 125 parts being preferred.

The proportion of the phenolic resin is advantageously in the range of between about 1 part and 10 parts by weight for 100 parts of the vinyl polymer and preferably between about 2 and 8 parts. The blowing agent advantageously comprises between about 1 and 5 parts per 100 parts of the vinyl polymer. Greater amounts of blowing agents do not appear to provide any additional benefits.

The proportion of the solvent varies from about 5 parts to 25 parts per 100 parts by weight of the vinyl polymer and advantageously between about 10 parts and 20 parts.

The filler may be employed in widely varying amounts without deleteriously affecting the gasket composition of the invention. For example, the proportion may vary from about 20 parts up to about 200 or more parts by weight per 100 parts of the vinyl polymer and preferably between about 35 and 75 parts by weight. Other materials employed in the gasket composition such as the pigment, lubricants, stabilizers, etc., generally also comprise only a fraction of the vinyl polymer and advantageously comprise less than about 15 or 20 parts by weight per 100 parts of the vinyl polymer.

Since the vinyl plastisol of the present invention adheres tightly to untreated metal surfaces, provided they are reasonably clean, the plastisol may be applied to the metal surface directly without the application of any intermediate or base coating. Also, since the plastisol adheres tightly even in relatively thick coatings, coatings up to 0.05 inch or so in thickness may be applied in a single step without blistered surfaces. Preferably, the plastisol is fused at a temperature of about 325°–400° F. during which time the blowing agent decomposes and releases a gas to produce the cellular structure of the plastisol.

The following examples describe the plastisol of the invention in greater detail and are intended to illustrate rather than to restrict the scope of the invention. In the examples, parts and percentages are by weight.

EXAMPLE I

About 80 parts of a 1–2 micron average particle size vinyl chloride polymer having a specific viscosity of about 0.35 and 20 parts of a 10 micron average particle size copolymer of vinyl chloride and vinylidene chloride having a specific viscosity of about 0.4 were mixed with about 50 parts of calcium carbonate having an average particle size of about 10 microns, 3 parts of phenol-formaldehyde resin powder (200 mesh size), having a specific gravity of about 1.25, 85 parts of a polymerized ester plasticizer sold by Rohm and Haas Co. as Paraplex G-31, 15 parts of n-octyl n-decyl adipate, and 2 parts of azobisformamide plus suitable pigments, stabilizers, and lubricants. During the mixing with a high-speed mixer, 15 parts of butyl carbitol were added and agitation was continued until a uniform dispersion was formed. The dispersion had a viscosity of about 3000 centipoises at room temperature.

A portion of the above dispersion was used to form a gasket for a metal closure to be employed on a paint can by placing a 700 milligram portion thereof in a groove formed in the top of a 3 inch diameter paint can closure. The closures were then heated to a temperature of about 380° F. for about two minutes to complete the formation of the gaskets. The gaskets were examined and found to be soft and resilient and free of surface holes.

The closures were then applied to a number of cans containing various types of paints. The containers were examined and found to be tightly sealed and did not leak. After an extended storage period, the containers were examined again and no leakage was found. The closures were then removed, and the removal was accomplished without undue effort. The gaskets were examined and found to be intact and did not exhibit any change or deterioration. Likewise, the paint in the cans was examined and found to be in good condition and not adulterated or decomposed.

EXAMPLE II

The procedure of this example was the same as that of Example I, except that the plastisol contained about 6 parts of the phenol-formaldehyde resin powder.

The plastisol was used in the formation of gaskets as in Example I, and tests of the resulting closures indicated that the gaskets performed in a manner similar to those of Example I.

EXAMPLE III

The procedure of this example was the same as that of Example I, except that 100 parts of a polymerized ester plasticizer sold by Emery Industries, Inc. as Polymeric 9717 were employed instead of the plasticizers used in Example I. The gaskets formed showed similar performance characteristics to the gaskets of the previous examples.

EXAMPLE IV

The procedure of this example was the same as that of Example I, except that instead of using a mixture of vinyl polymers, the vinyl polymer was polyvinyl chloride of a 1–2 micron average particle size having a specific viscosity of about 0.5.

EXAMPLE V

The procedure of this example was the same as that of Examples I–IV with respect to the preparation of the vinyl plastisol. However, instead of forming gaskets for paint cans as in the earlier examples, the plastisols were used to coat supporting feet used under appliances such as refrigerators, washers, dryers, etc. These feet had an enlarged head portion and a threaded stem portion. In each case, the heads of the supporting feet were preheated to about 400° F. and then were dipped into the plastisol and withdrawn with a thick coating thereon. The coated feet were fused at a temperature of about 400° F. for about five minutes.

After the completion of the processing, the feet were examined and were found to have a smooth, tightly adherent plastisol coating on the head portion thereof. The plastisol coating was smooth and free from flaws. Samples of the plastisol were sectioned and found to have a thickness of about 3/64 inch. After other samples of the feet had been used on appliances for an extended period, they were examined again and it was found that the plastisol coating had not changed.

The above description and examples show that the novel plastisol composition of the present invention overcomes many of the difficulties of prior vinyl plastisol compositions and, in addition, provides advantages and benefits heretofore considered unattainable. The plastisols of the invention are tightly adherent to bare metal surfaces without the use of any intermediate or base coating, and also the plastisols have a high degree of solvent resistance. In addition, the plastisol composition may be easily and conveniently applied to bare metal surfaces in relatively thick coatings which reduces the number of coating applications required. Also, the gaskets made from the vinyl plastisol composition of the invention provide excellent sealing, removal and storage performance characteristics. Moreover, gaskets and other products made from the plastisol of the invention have a uniform cellular structure without surface holes or imperfections and may be formed from a minimum amount of plastisol material to achieve desired softness and resilience. Furthermore, the plastisol composition of the invention may be formulated without difficulty and is relatively low in cost.

From the above description, it will be apparent that various modifications in the specific formulations and procedures described may be made within the scope of

What is claimed is:

1. A solvent-resistant plastisol consisting essentially of a vinyl chloride polymer, a powdered phenol-formaldehyde resin, a filler, a polymerized ester plasticizer having a molecular weight between 4000 and 8000, a blowing agent and an aliphatic or aromatic solvent having a boiling point above 195° C., said phenolic resin comprising between about 1 and 10 parts by weight, said filler comprising between about 20 and 200 parts by weight, said plasticizer comprising between about 50 and 200 parts by weight, and said blowing agent comprising between about 1 and 5 parts by weight for each 100 parts of vinyl chloride polymer.

2. A plastisol as set forth in claim 1 wherein the solvent is selected from the group consisting of hexylene glycol, butylcarbitol and benzyl alcohol.

3. A solvent-resistant plastisol consisting essentially of a vinyl chloride polymer, a powdered phenol-formaldehyde resin, a filler, a polymerized ester plasticizer, a diester plasticizer, a blowing agent and a glycol ether solvent having a boiling point above 195° C., said phenolic resin comprising between about 2 and 8 parts by weight, said filler comprising between about 35 and 75 parts by weight, said plasticizers comprising between about 75 and 125 parts by weight, said blowing agent comprising between about 1 and 5 parts by weight, and said solvent comprising between about 10 and 20 parts by weight for each 100 parts of vinyl chloride polymer.

4. A plastisol as set forth in claim 3 wherein the diester plasticizer is a diester of a dibasic acid selected from the group consisting of sebacic, adipic, and azelaic acids condensed with an alkyl alcohol having 4 to 16 carbon atoms.

5. A solvent-resistant plastisol consisting essentially of a vinyl chloride polymer, a powdered phenol-formaldehyde resin, a filler, a polymerized ester plasticizer having a molecular weight between 4000 and 8000, an adipate plasticizer, a blowing agent and a glycol ether solvent having a boiling point above 195° C., said phenolic resin comprising between about 2 and 8 parts by weight, said filler comprising between about 35 and 75 parts by weight, said plasticizers comprising between about 75 and 125 parts by weight, said blowing agent comprising between about 1 and 5 parts by weight, and said solvent comprising between about 10 and 20 parts by weight for each 100 parts of vinyl chloride polymer.

References Cited

UNITED STATES PATENTS

| | | | |
|---|---|---|---|
| 3,032,826 | 5/1962 | Brillinger | 215—40 |
| 3,245,566 | 4/1966 | Szalay | 260—31.8MT |
| 3,002,641 | 10/1961 | Normandy | 215—40 |
| 3,118,783 | 1/1964 | Nagle et al. | 215—40 |

OTHER REFERENCES

"Plasticizers—Paraplex—Monoplex," Rohm & Haas Co., The Resinous Products Division, copyright by Rohm & Haas Co., December 1951, pp. 4, 42 and 43.

SAMUEL H. BLECH, Primary Examiner

M. FOELAK, Assistant Examiner

U.S. Cl. X.R.

161—160; 260—31.4, 31.8, 33.2, 33.4, 38, 41, 847